(12) United States Patent
Suo et al.

(10) Patent No.: US 8,422,479 B2
(45) Date of Patent: Apr. 16, 2013

(54) METHOD, SYSTEM, BASE STATION AND TERMINAL FOR PROCESSING THE REFERENCE SYMBOL

(75) Inventors: Shiqiang Suo, Beijing (CN); Yongjun Deng, Beijing (CN); Shaohui Sun, Beijing (CN); Yingmin Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 599 days.

(21) Appl. No.: 12/596,169

(22) PCT Filed: Apr. 17, 2008

(86) PCT No.: PCT/CN2008/000787
§ 371 (c)(1),
(2), (4) Date: Nov. 25, 2009

(87) PCT Pub. No.: WO2008/125020
PCT Pub. Date: Oct. 23, 2008

(65) Prior Publication Data
US 2010/0118743 A1    May 13, 2010

(30) Foreign Application Priority Data
Apr. 17, 2007  (CN) .......................... 2007 1 0098414

(51) Int. Cl.
*H04B 7/208* (2006.01)
(52) U.S. Cl.
USPC ......................................................... 370/344
(58) Field of Classification Search .................. 370/277, 370/281, 295, 328, 330, 336, 337, 343, 344, 370/370/347, 331, 332, 334, 339, 464, 480, 370/491, 496
See application file for complete search history.

(56) References Cited

U.S. PATENT DOCUMENTS

| | | | |
|---|---|---|---|
| 8,073,063 B2* | 12/2011 | Ma et al. ........................ | 375/260 |
| 2005/0259686 A1* | 11/2005 | Lewis ........................... | 370/469 |
| 2007/0070944 A1* | 3/2007 | Rinne et al. ................... | 370/329 |
| 2007/0189240 A1* | 8/2007 | Cho et al. ...................... | 370/337 |
| 2008/0212702 A1* | 9/2008 | Pan et al. ...................... | 375/260 |
| 2010/0290426 A1* | 11/2010 | Guey et al. .................... | 370/330 |
| 2011/0176581 A1* | 7/2011 | Thomas et al. ............... | 375/146 |
| 2012/0020434 A1* | 1/2012 | Callard et al. ................ | 375/296 |

FOREIGN PATENT DOCUMENTS

| | | |
|---|---|---|
| CN | 1579063 | 2/2005 |
| CN | 1658528 | 8/2005 |
| CN | 101132255 | 2/2008 |
| WO | WO 2007/022630 | 3/2007 |

\* cited by examiner

*Primary Examiner* — Michael Thier
*Assistant Examiner* — Feben M Haile
(74) *Attorney, Agent, or Firm* — Fay Kaplun & Marcin, LLP

(57) ABSTRACT

A method, system, base station and User Equipment for processing reference symbols is provided to support the transmission of both common reference symbols and user-specific reference symbols. In the present invention, a transmitting end configures the reference symbol structure for a downlink subframe according to the number of the used antenna; the transmitting end inserts the common reference symbols and the user-specific reference symbols to be transmitted into the downlink subframe according to the reference symbol structure and transmits them. With the user of the present invention, both the common reference symbols and the user-specific reference symbols can be transmitted.

7 Claims, 7 Drawing Sheets

--Prior Art--

--Prior Art--

METHOD, SYSTEM, BASE STATION AND TERMINAL FOR PROCESSING THE REFERENCE SYMBOL

FIELD OF THE INVENTION

The present invention relates to Orthogonal Frequency Division Multiplexing (OFDM) technologies in the field of communications, and particularly to a method, system, base station and User Equipment for processing reference symbols.

BACKGROUND OF THE INVENTION

In a system where OFDM modulation is performed on a downlink, there is a need for measuring downlink channel quality by transmitting reference symbols, and performing frequency-dependent scheduling according to the channel quality measurements.

In a Long Term Evolution (LTE) system, it has been specified that the Orthogonal Frequency Division Multiple Access (OFDMA) mode is used for the downlink, and two frame structures, i.e. a Generic frame structure and an Alternative frame structure, are supported.

The Generic frame structure supports two types of duplex modes including a Frequency Division Duplex (FDD) mode and a Time Division Duplex (TDD) mode. In the Generic frame structure as shown in FIG. 1, a radio frame having a length of 10 ms is constituted of 10 subframes of the same length, and each of the subframes is constituted of two slots having the same length of $T_{slot}$ of 0.5 ms. Each of the two slots may be constituted of 7 or 6 OFDM symbols, depending on the configured Cyclic Prefixes (CPs) of different lengths. A generic slot is constituted of 7 OFDM symbols if a generic CP (which is of a relatively small length) is used, and the generic slot is constituted of 6 OFDM symbols if an extended CP (which is of a relatively large length) is used.

Currently, a structure of common reference symbols has been determined for the Generic frame structure. The structure of the common reference symbols within a subframe when a generic CP is used is shown in FIG. 2a, and the structure of the common reference symbols within a subframe when an extended CP is used is shown in FIG. 2b. As shown, Ri denotes a common reference symbol transmitted by the ith transmission antenna, where i=1, . . . , 4, and one common reference symbol R1 is transmitted in the case of one transmission antenna, common reference symbols R1 and R2 are transmitted in the case of two transmission antennae, and common reference symbols R1, R2, R3 and R4 are transmitted in the case of four transmission antennae.

The Alternative frame structure supports the TDD mode and is compatible with a Time Division Synchronized Code Division Multiple Access (TD-SCDMA) system, as shown in FIG. 3. As shown, a radio frame having a length of 10 ms is constituted of two half-frames each having a length of 5 ms, and each of the half-frames is constituted of 7 generic slots (TS0~TS6) and 3 special slots. The generic slots are used for transmitting data, and the 3 special slots are respectively a Downlink Pilot Time Slot (DwPTS) (which represents a downlink reference symbol channel in the LTE system and is used for transmitting system downlink synchronization information), an Uplink Pilot Time Slot (UpPTS) (which represents an uplink reference symbol channel in the LTE system and is used for transmitting uplink synchronization information for user access), and a Guard Period (GP) (which is a guard slot and is used for providing a time period for the transition from the downlink transmission slot to the uplink transmission slot). A generic slot is constituted of 9 or 8 OFDM symbols, depending on the configured CPs having different lengths. When the generic CP (which is of a relatively small length) is used, a generic slot is constituted of 9 OFDM symbols, and when the extended CP (which is of a relatively large length) is used, the generic slot is constituted of 8 OFDM symbols.

Currently, a structure of common reference symbols that has been determined for the Alternative frame structure is shown in each of FIGS. 4a and 4b. The structure of the common reference symbols in the case of the generic CP is shown in FIG. 4a, and the structure of the common reference symbols in the case of the extended CP is shown in FIG. 4b. Ri denotes a common reference symbol transmitted by the ith transmission antenna, where i=1, . . . , 4, and one common reference symbol R1 is transmitted in the case of one transmission antenna, common reference symbols R1 and R2 are transmitted in the case of two transmission antennae, and common reference symbols R1, R2, R3 and R4 are transmitted in the case of four transmission antennae.

It has been found that user-specific reference symbols are required to be introduced in addition to the common reference symbols if a closed-loop multi-antenna transmission technology such as beam-shaping is used. Therefore, there exists a need to transmit both the common reference symbols and the user-specific reference symbols.

SUMMARY OF THE INVENTION

An embodiment of the present invention provides a method, system, base station and User Equipment for processing reference symbols, to support the transmission of both common reference symbols and user-specific reference symbols.

A method for processing reference symbols provided in an embodiment of the present invention includes:

configuring, by a transmitting end, a reference symbol structure for a downlink subframe according to the number of the deployed antennae; and inserting, by the transmitting end, common reference symbols and user-specific reference symbols to be transmitted into the downlink subframe according to the reference symbol structure, and transmitting the common reference symbols and the user-specific reference symbols.

An embodiment of the present invention further provides a communication system, and the communication system includes:

a transmitting end configured to configure a reference symbol structure for a downlink subframe according to the number of the deployed antennae; insert common reference symbols and user-specific reference symbols to be transmitted into the downlink subframe and transmit the common reference symbols and the user-specific reference symbols, according to the reference symbol structure; and transmit reference symbol indication information; and a receiving end configured to receive the downlink subframe, and obtain the common reference symbols and the user-specific reference symbols according to the reference symbol indication information.

An embodiment of the present invention further provides a base station including:

a transmitting module configured to transmit a message;

a configuring module configured to configure a reference symbol structure for a downlink subframe according to the number of the deployed antennae;

an inserting module configured to insert common reference symbols and user-specific reference symbols to be transmitted into the downlink subframe according to the reference symbol structure, and instruct the transmitting module to transmit the common reference symbols and the user-specific reference symbols; and a notifying module configured to instruct the transmitting module to transmit reference symbol indication information.

An embodiment of the present invention further provides a User Equipment including:

a receiving module configured to receive a message; and a processing module configured to obtain common reference symbols and user-specific reference symbols according to reference symbol indication information received by the receiving module.

With the use of the solutions in the embodiments of the present invention, both the common reference symbols and user-specific reference symbols may be transmitted; further, a uniform reference symbol structure may be configured for the downlink subframe by the transmitting end according to the number of the deployed antennae, therefore, the transmission of the common reference symbols and the user-specific reference symbols may be effected easily.

DETAILED DESCRIPTION OF THE EMBODIMENTS

In an embodiment of the present invention, a transmitting end may configure a reference symbol structure for a downlink subframe according to the number of the deployed antennae.

The transmitting end may insert common reference symbols and user-specific reference symbols to be transmitted into the downlink subframe according to the reference symbol structure, and transmitting the common reference symbols and the user-specific reference symbols.

Further, a receiving end may receive the downlink subframe, and obtain the common reference symbols and the user-specific reference symbols according to the reference symbol indication information transmitted by the transmitting end.

The invention is described in detail below in connection with the drawings and embodiments of the invention.

A First Embodiment

Figure 1:
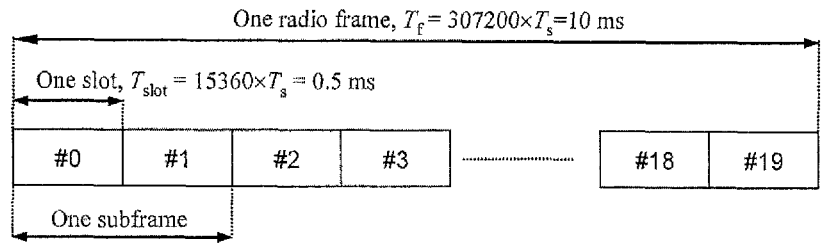
FIG. 1 is a schematic diagram showing the Generic frame structure.
Figure 2A:
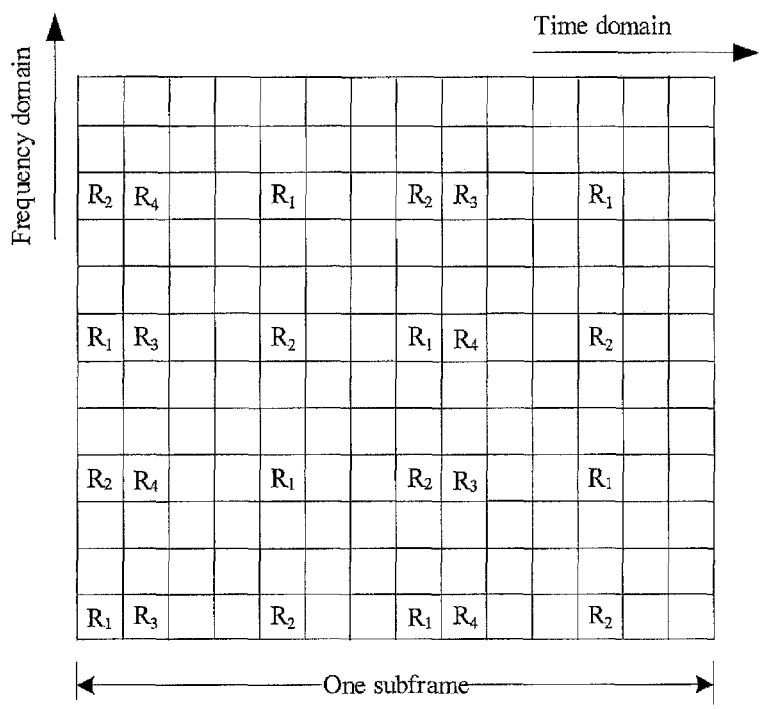
FIG. 2a shows the structure of common reference symbols within a subframe when a generic CP is used for the Generic frame structure.
Figure 2B:
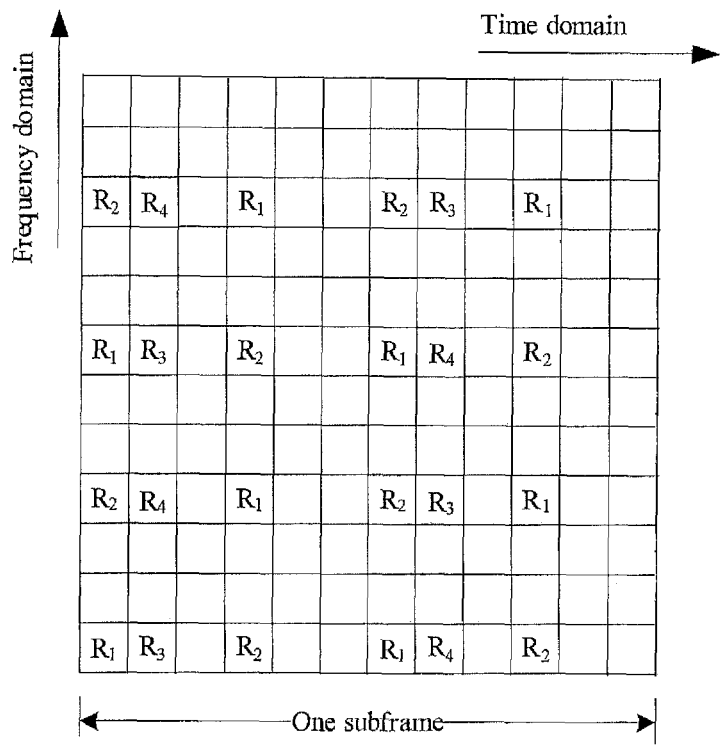
FIG. 2b shows the structure of common reference symbols within a subframe when an extended CP is used for the Generic frame structure.
Figure 3:
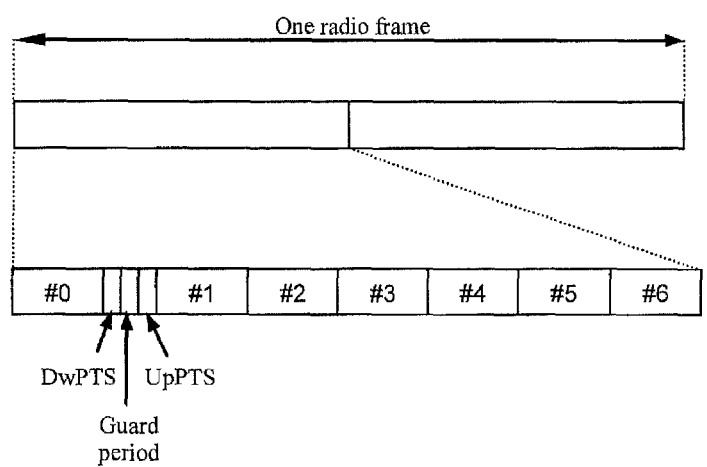
FIG. 3 is a schematic diagram showing the Alternative frame structure.
Figure 4A:
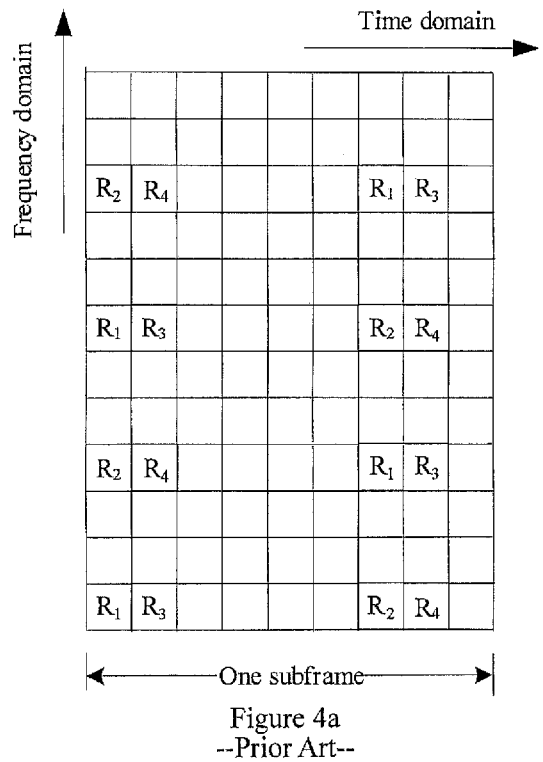
FIG. 4a shows the structure of common reference symbols within a subframe when a generic CP is used for the Alternative frame structure.
Figure 4B:
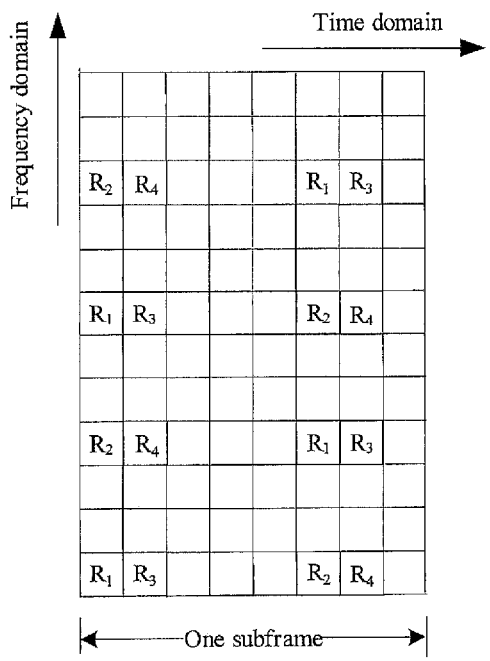
FIG. 4b shows the structure of common reference symbols within a subframe when an extended CP is used for the Alternative frame structure.
Figure 5:
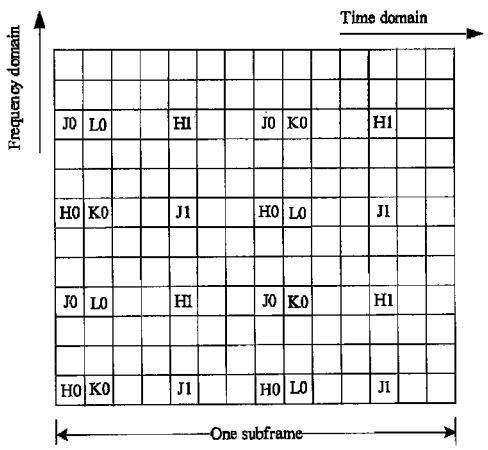
FIG. 5 shows an initial structure of reference symbols within a subframe in an example according to a first embodiment of the present invention.

In the first embodiment, the Generic frame structure is used and the subframe structure in the case of the generic CP is used. In an example according to the first embodiment, an initial structure of reference symbols within a subframe is shown in FIG. 5. As shown, H0, J0, K0, L0, H1, J1 represents respectively 6 reference symbols orthogonal to each other. Thus, a group of sub-carriers of the common reference symbols and sub-carriers of the user-specific reference symbols are located at the first OFDM symbol, the second OFDM symbol and the antepenultimate OFDM symbol within a slot.

Accordingly, in the initial structure of reference symbols, the sub-carriers of the common reference symbols or the sub-carriers of the user-specific reference symbols (e.g. H0 or K0) within the same subgroup are distributed evenly at the respective OFDM symbols, and the sub-carriers of the common reference symbols or the sub-carriers of the user-specific reference symbols within different subgroups are spaced by one or more sub-carriers in the frequency domain.

Figure 6:
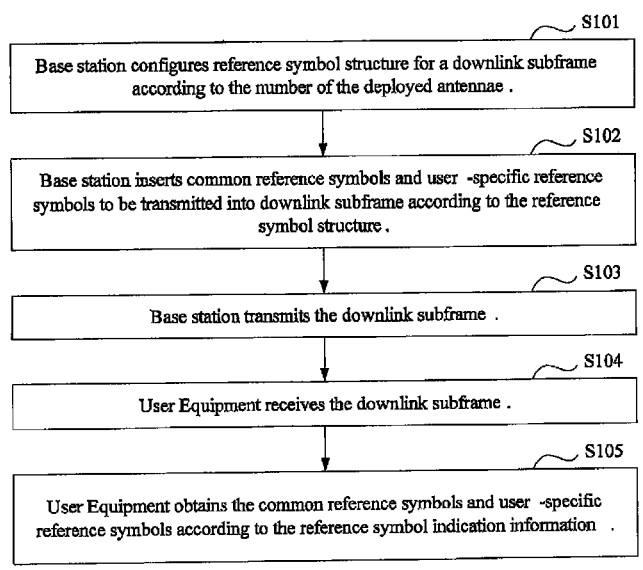
FIG. 6 is a flow chart of processing the reference symbols in the first embodiment of the present invention.

In the first embodiment, a flow chart of processing reference symbols is shown in FIG. 6 and includes as follows.

Step S101: A base station functioning as a transmitting end configures reference symbol structure for a downlink subframe according to the number of the deployed antennae.

In an example according to the first embodiment, if the number of the antennae used by the base station is equal to 2, the initial structure of reference symbols as shown in FIG. 5 may be further configured as the reference symbol structure according to Table 1 below:

TABLE 1

| | Reference symbol | | | |
|---|---|---|---|---|
| | H0, H1 | J0, J1 | K0 | L0 |
| Transmission pattern | Ant 0 | Ant 1 | Beam 0 | Beam 1 | where, "Ant x" denotes the xth antenna used for transmitting the common reference symbols, where x=0, 1; "Beam y" denotes the yth beam used for transmitting the user-specific reference symbols, where y=0, 1.

The resultant reference symbol structure still has a structural characteristic of the initial structure of reference symbols.

After further configuring the initial structure of reference symbols as shown in FIG. 5 as the reference symbol structure according to Table 1, H0 and H1 are transmitted using the 0th antenna, J0 and J1 are transmitted using the 1st antenna, K0 is transmitted using the 0th beam, and L0 is transmitted using the 1st beam.

In the case of such transmission, to insert into the downlink subframe the common reference symbols and the user-specific reference symbols to be transmitted, the common reference symbols to be transmitted using the same antenna or the user-specific reference symbols to be transmitted using the same beam are inserted in an interleaving way into various OFDM symbols. For example, H0 and H1 to be transmitted using the 0th antenna are inserted in an interleaving way into the first OFDM symbol and the antepenultimate OFDM symbol within one slot, likewise, other groups of reference symbols are inserted in an interleaving way into the respective OFDM symbols.

If the number of the antennae used by the base station is equal to 4, the initial structure of reference symbols as shown in FIG. 5 may be further configured as the reference symbol structure according to Table 2 below:

TABLE 2

| | Reference symbol | | | | | |
|---|---|---|---|---|---|---|
| | H0 | J0 | K0 | L0 | H1 | J1 |
| Transmission pattern | Ant 0 | Ant 1 | Ant 2 | Ant 3 | Beam 0 | Beam 1 | where, "Ant x" denotes the xth antenna used for transmitting the common reference symbols, where x=0, . . . , 3; "Beam y" denotes the yth beam used for transmitting the user-specific reference symbols, where y=0, 1.

If the number of the antennae used by the base station is equal to 1, no user-specific reference symbol may be transmitted. To be compatible with the case where the number of the antennae used by the base station is equal to 1 and the common reference symbols may be transmitted, it may be specified to further configure the initial structure of reference symbols as shown in FIG. 5 according to Table 3 below if the number of the antennae used by the base station is equal to 1.

TABLE 3

| | Reference symbol | | | |
|---|---|---|---|---|
| | H0, H1 | J0, J1 | K0 | L0 |
| Transmission pattern | Ant 0 | N/A | N/A | N/A | where, "Ant 0" denotes the 0th antenna; "N/A" denotes that the associated reference symbol may not be transmitted, and the corresponding reference symbol location may be used for transmitting a data symbol or unused.

Accordingly, in Step S101, the reference symbol structure for the respective antenna number may be obtained in connection with the initial structure of reference symbols and the table used for further configuration.

Step S102: The base station inserts the common reference symbols and the user-specific reference symbols to be transmitted into the downlink subframe according to the reference symbol structure.

In an example where the number of the antennae used by the base station is equal to 2, the common reference symbols to be transmitted may be inserted into H0, H1, J0 and J1, in a way depending on the data of the common reference symbols to be transmitted.

Step S103: The downlink subframe is transmitted by the base station.

The flow of processing the reference symbols according to the first embodiment may be finished with Step S103, that is, a complete flow of transmitting the reference symbols has been performed. However, steps below may be further included.

Step S104: A User Equipment acting as a receiving end receives the downlink subframe.

Step S105: The User Equipment obtains the common reference symbols and the user-specific reference symbols according to reference symbol indication information transmitted by the transmitting end.

The reference symbol indication information may contain information on the reference symbol structure, the number of the antennae used by the base station, and the distribution of the user-specific reference symbols within the downlink subframe (that is, information indicating one or more subframes, or even one or more sub-carriers, which use the user-specific reference symbols). The information on the reference symbol structure and the number of the antennae used by the base station may be notified to the User Equipment through broadcasting, the information on the distribution of the user-specific reference symbols may be notified to the User Equipment through broadcasting or control signaling, or in an implicit way.

To determine whether the information on the distribution of the user-specific reference symbols is notified to the User Equipment through broadcasting or the control signaling, the base station may determine whether the information on the distribution of the user-specific reference symbols is maintained unchanged within a preset time period or the preset number of frames; if the information on the distribution of the user-specific reference symbols is maintained unchanged within a preset time period or the preset number of frame, the information on the distribution of the user-specific reference symbols may be sent through broadcasting, otherwise, the information on the distribution of the user-specific reference symbols may be sent through the control signaling. It will be appreciated that the information on the distribution of the user-specific reference symbols may be notified the User Equipment always through broadcasting or the control signaling. Thus, the reference symbol indication information may be transmitted through broadcasting, or through both broadcasting and control signaling.

If the information on the distribution of the user-specific reference symbols is transmitted in an implicit way, the information on the distribution may be bound to the frame structure or the duplex mode. For example, a particular distribution of the user-specific reference symbols is used for the Generic frame structure, and another particular distribution of the user-specific reference symbols is used for the Alternative frame structure; or a particular distribution of the user-specific reference symbols is used for the FDD mode, and another particular distribution of the user-specific reference symbols is used for the TDD mode, in this case, the information on the distribution of the user-specific reference symbols within the downlink subframe may be obtained at the receiving end according to the frame structure or duplex mode used by the received subframe.

Figure 7:
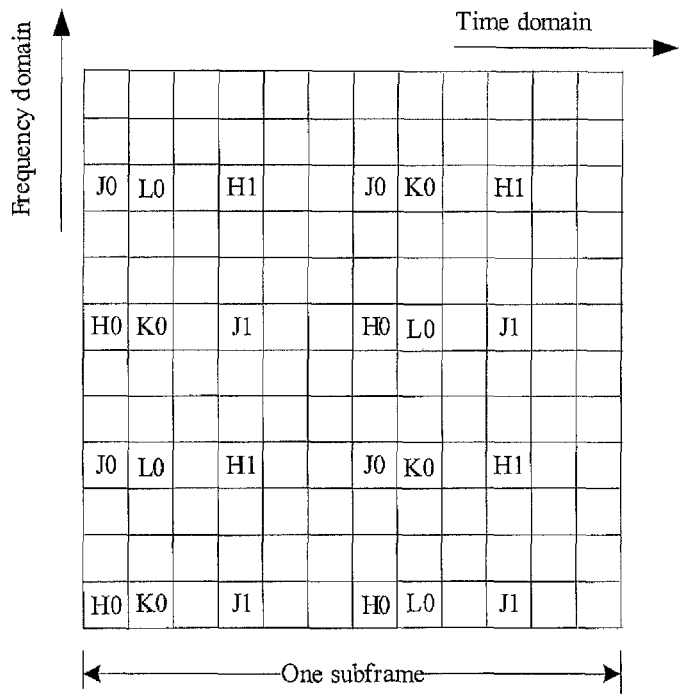
FIG. 7 shows an initial structure of reference symbols within a subframe in another example according to a first embodiment of the present invention.

In the case where the Generic frame structure is used and the subframe structure in the case of the extended CP is used, the initial structure of the reference symbols within a subframe as shown in FIG. 7 may be used; further, if the extended CP is used, the corresponding processing flow may be the same with that in the case where the generic CP is sued.

A Second Embodiment

Figure 8:
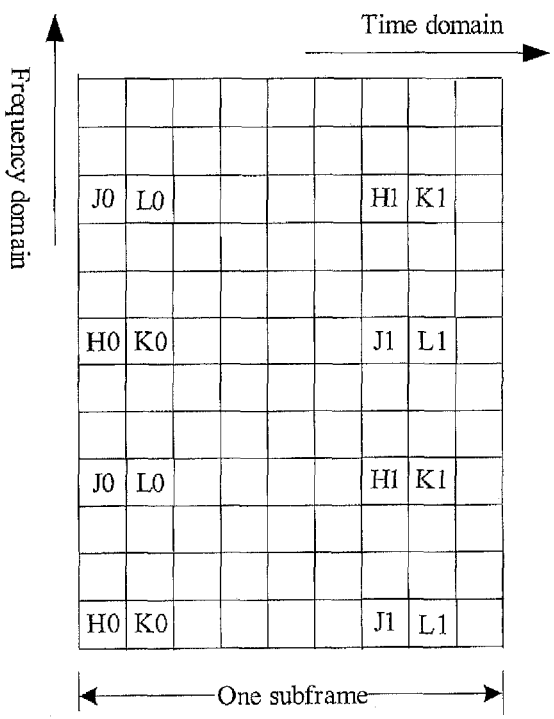
FIG. 8 shows an initial structure of reference symbols within a subframe in an example according to a second embodiment of the present invention.

In the second embodiment, the Alternative frame structure is used and the subframe structure in the case of the generic CP is used. In an example according to the second embodiment, an initial structure of reference symbols within a subframe is shown in FIG. 8. As shown, H0, J0, K0, L0, H1, J1, K1 and L1 represents respectively 8 reference symbols orthogonal to each other. Thus, a group of sub-carriers of the common reference symbols and sub-carriers of the user-specific reference symbols are located at the first two OFDM symbols, the penultimate OFDM symbol and the antepenultimate OFDM symbol within a subframe.

Accordingly, in the initial structure of reference symbols, the sub-carriers of the common reference symbols or the sub-carriers of the user-specific reference symbols (e.g. H0 or K0) within the same subgroup are distributed evenly at the respective OFDM symbols, and the sub-carriers of the common reference symbols or the sub-carriers of the user-specific reference symbols within different subgroups are spaced by one or more sub-carriers in the frequency domain.

A reference may be made to the flow chart of processing the reference symbols in the first embodiment for the flow chart of processing the reference symbols in the second embodiment may. However, the particular configuration of the reference symbol structure may be different. For example, in an example according to the second embodiment, if the number of the antennae used by a base station is equal to 2, the initial structure of reference symbols as shown in FIG. 8 may be further configured as the reference symbol structure according to Table 4 below.

TABLE 4

| | Reference symbol | | | |
|---|---|---|---|---|
| | H0, H1 | J0, J1 | K0, K1 | L0, L1 |
| Transmission pattern | Ant 0 | Ant 1 | Beam 0 | Beam 1 |

After further configuring the initial structure of reference symbols as shown in FIG. 8 as the reference symbol structure according to Table 4, H0 and H1 are transmitted using the 0th antenna, J0 and J1 are transmitted using the 1st antenna, K0 and K1 are transmitted using the 0th beam, and L0 and L1 are transmitted using the 1st beam.

If the number of the antennae used by the base station is equal to 4, the initial structure of reference symbols as shown in FIG. 8 may be further configured as the reference symbol structure according to Table 5 below:

TABLE 5

| | Reference symbol | | | | | |
|---|---|---|---|---|---|---|
| | H0 | J0 | H1 | J1 | K0, K1 | L0, L1 |
| Transmission pattern | Ant 0 | Ant 1 | Ant 2 | Ant 3 | Beam 0 | Beam 1 |

To be compatible with the case where the number of the antennae used by the base station is equal to 1 and the common reference symbols may be transmitted, it may be specified to further configure the initial structure of reference symbols as shown in FIG. 8 according to Table 6 below if the number of the antennae used by the base station is equal to 1.

TABLE 6

| | Reference symbol | | | |
|---|---|---|---|---|
| | H0, H1 | J0, J1 | K0, K1 | L0, L1 |
| Transmission pattern | Ant 0 | N/A | N/A | N/A |

Figure 9:
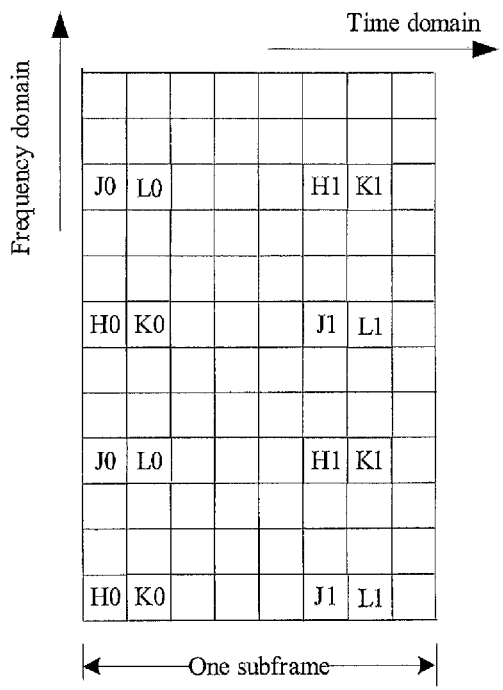
FIG. 9 shows an initial structure of reference symbols within a subframe in another example according to a second embodiment of the present invention.

In the case where the Alternative frame structure is used and the subframe structure in the case of the extended CP is used, the initial structure of the reference symbols within a subframe as shown in FIG. 9 may be used; further, if the extended CP is used, the corresponding processing flow may be the same with that in the case where the generic CP is sued.

A Third Embodiment

At most two beams may be used for transmission in the first and second embodiments. To support the transmission of up to four beams, the following flow of processing reference symbols may be used.

In an example of the initial structure of reference symbols as shown in FIG. 5, where the Generic frame structure is used and the subframe structure in the case of generic CP is used, if the number of the antennae used by a base station is equal to 1 in an example according to the third embodiment, the initial structure of reference symbols as shown in FIG. 7 may be further configured as the reference symbol structure according to Table 7 below.

TABLE 7

| | Reference symbol | | | |
|---|---|---|---|---|
| | H0, H1 | J0, J1 | K0 | L0 |
| Transmission pattern | Ant 0 | N/A | N/A | N/A |

If the number of the antennae used by a base station is equal to 2, the initial structure of reference symbols as shown in FIG. 5 may be further configured as the reference symbol structure according to Table 8 below.

TABLE 8

| | Reference symbol | | | | | |
|---|---|---|---|---|---|---|
| | H0 | J0 | H1 | J1 | K0 | L0 |
| Transmission pattern | Ant 0 | Ant 1 | Beam 0 | Beam 1 | N/A | N/A |

If the number of the antennae used by a base station is equal to 4, the initial structure of reference symbols as shown in FIG. 5 may be further configured as the reference symbol structure according to Table 9 below.

TABLE 9

| | Reference symbol | | | | | | | |
|---|---|---|---|---|---|---|---|---|
| | H0 | J0 | K0 (slot 1) | L0 (slot 1) | H1 | J1 | K0 (slot 2) | L0 (slot 2) |
| Transmission pattern | Ant 0 | Ant 1 | Ant 2 | Ant 3 | Beam 0 | Beam 1 | Beam 2 | Beam 3 |

Thus, in the third embodiment, reference symbols K0 and L0 are configured as being transmitted respectively using an antenna and a beam in two slot of a subframe.

The case where the Generic frame structure is used and the subframe structure in the case of the extended CP is used is substantially the same with the case where the generic CP is used, except for the initial structures of reference symbols, and hence further description thereof is omitted herein.

In an example of the initial structure of reference symbols as shown in FIG. 8, where the Alternative frame structure is used and the subframe structure in the case of generic CP is used, if the number of the antennae used by a base station is equal to 1 in another example according to the third embodiment, the initial structure of reference symbols as shown in FIG. 8 may be further configured as the reference symbol structure according to Table 10 below.

TABLE 10

|  | Reference symbol | | | |
| --- | --- | --- | --- | --- |
|  | H0, H1 | J0, J1 | K0, K1 | L0, L1 |
| Transmission pattern | Ant 0 | N/A | N/A | N/A |

If the number of the antennae used by a base station is equal to 2, the initial structure of reference symbols as shown in FIG. 8 may be further configured as the reference symbol structure according to Table 11 below.

TABLE 11

|  | Reference symbol | | | | | |
| --- | --- | --- | --- | --- | --- | --- |
|  | H0 | J0 | H1 | J1 | K0, K1 | L0, L1 |
| Transmission pattern | Ant 0 | Ant 1 | Beam 0 | Beam 1 | N/A | N/A |

If the number of the antennae used by a base station is equal to 4, the initial structure of reference symbols as shown in FIG. 8 may be further configured as the reference symbol structure according to Table 12 below.

TABLE 12

|  | Reference symbol | | | | | | | |
| --- | --- | --- | --- | --- | --- | --- | --- | --- |
|  | H0 | J0 | K0 | L0 | H1 | J1 | K1 | L1 |
| Transmission pattern | Ant 0 | Ant 1 | Ant 2 | Ant 3 | Beam 0 | Beam 1 | Beam 2 | Beam 3 |

The case where the Alternative frame structure is used and the subframe structure in the case of the extended CP is used is substantially the same with the case where the generic CP is used, except for the initial structures of reference symbols, and hence further description thereof is omitted herein.

Thus, likewise, the transmission of 4 beams may be provided if the Alternative frame structure is used.

A Fourth Embodiment

Figure 10:
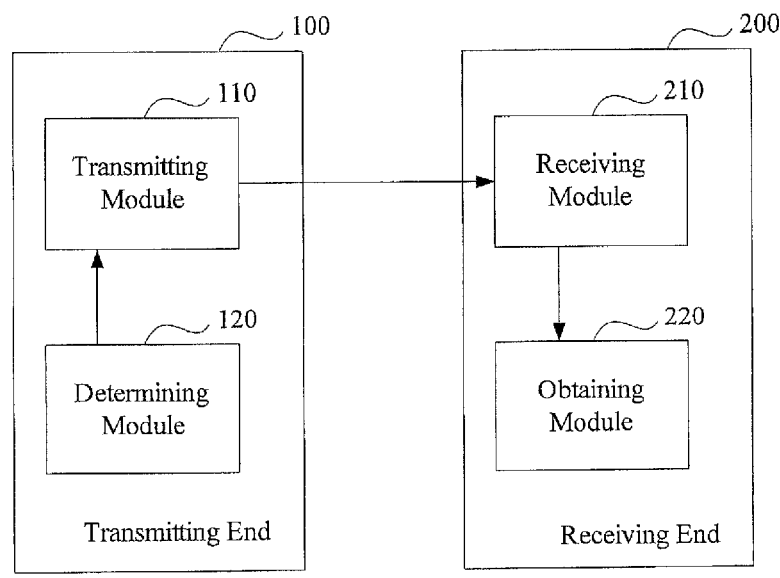
FIG. 10 is a block diagram showing a communication system according to a fourth embodiment of the present invention.

A communication system is provided in a fourth embodiment of the present invention, as shown in FIG. 10, the communication system includes:

a transmitting end 100, which is configured to configure a reference symbol structure for a downlink subframe according to the number of the used antennae, insert common reference symbols and user-specific reference symbols to be transmitted into the downlink subframe according to the reference symbol structure and transmit the common reference symbols and the user-specific reference symbols, and transmit reference symbol indication information; and a receiving end 200, which is configured to receive the downlink subframe, and obtain the common reference symbols and the user-specific reference symbols according to the reference symbol indication information.

The transmitting end 100 may further include:

a transmitting module 110 configured to transmit a message;

a determining module 120 configured to determine whether the information on the distribution of the user-specific reference symbols within the downlink subframe contained in the reference symbol indication information is maintained unchanged within a preset time period or the preset number of frames; if the information on the distribution of the user-specific reference symbols is maintained unchanged within a preset time period or the preset number of frame, instruct the transmitting module 110 to transmit the information on the distribution of the user-specific reference symbols through broadcasting, otherwise, instruct the transmitting module 110 to transmit the information on the distribution of the user-specific reference symbols through control signaling.

The receiving end 200 may further include:

a receiving module 210 configured to receive a message; and an obtaining module 220 configured to obtain the information on the distribution of the user-specific reference symbols within the downlink subframe according to the frame structure or the duplex mode used by the received subframe, where the information on the distribution of the user-specific reference symbols within the downlink subframe is bound to the frame structure or the duplex mode.

Figure 11:
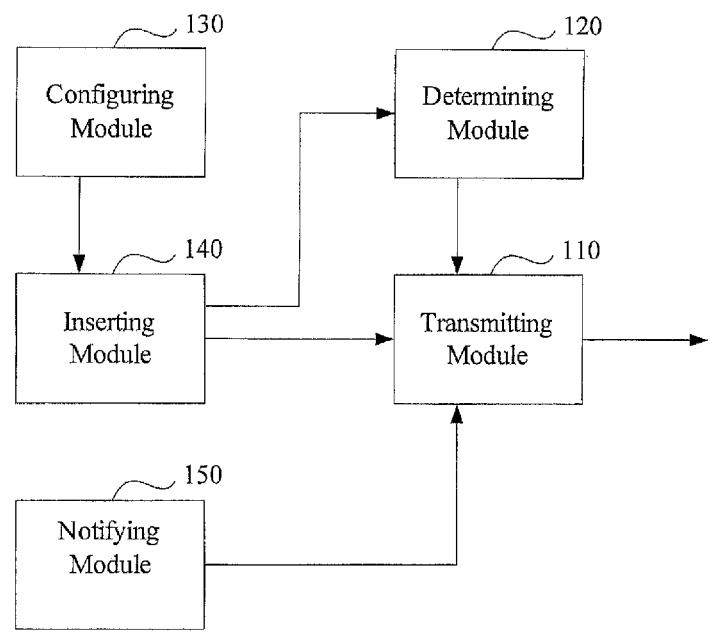
FIG. 11 is a block diagram showing a base station according to a fourth embodiment of the present invention.

A base station is provided in a fourth embodiment of the present invention, as shown in FIG. 11, and the base station includes:

a transmitting module 110 configured to transmit a message;

a configuring module 130 configured to configure a reference symbol structure for a downlink subframe according to the number of the deployed antennae;

an inserting module 140 configured to insert common reference symbols and user-specific reference symbols to be transmitted into the downlink subframe according to the reference symbol structure, and instruct the transmitting module 110 to transmit the common reference symbols and the user-specific reference symbols; and a notifying module 150 configured to instruct the transmitting module 110 to transmit reference symbol indication information.

The base station may further include: a determining module 120 configured to determine whether the information on the distribution of the user-specific reference symbols within the downlink subframe contained in the reference symbol indication information is maintained unchanged within a preset time period or the preset number of frames; if the information on the distribution of the user-specific reference symbols is maintained unchanged within a preset time period or the preset number of frame, instruct the transmitting module 110 to transmit the information on the distribution of the user-specific reference symbols through broadcasting, otherwise, instruct the transmitting module 110 to transmit the information on the distribution of the user-specific reference symbols through control signaling.

Figure 12:
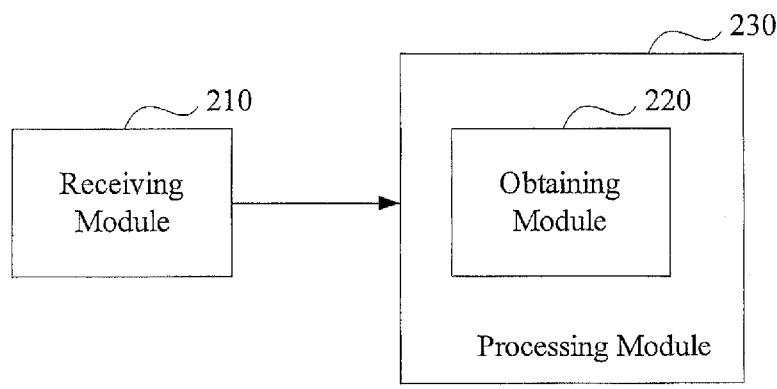
FIG. 12 is a block diagram showing a User Equipment according to a fourth embodiment of the present invention.

A User Equipment is provided in the fourth embodiment of the present invention, as shown in FIG. 12, and the User Equipment includes:

a receiving module 210 configured to receive a message; and a processing module 230 configured to obtain common reference symbols and user-specific reference symbols according to reference symbol indication information received by the receiving module 210.

The processing module 230 may further include: an obtaining module 220 configured to obtain the information on the distribution of the user-specific reference symbols within the downlink subframe according to the frame structure or the duplex mode used by the received subframe, where the information on the distribution of the user-specific reference symbols within the downlink subframe is bound to the frame structure or the duplex mode.

It will be appreciated that the skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

What is claimed is:

1. A method for processing reference symbols, comprising:
    configuring, by a transmitting end, a reference symbol structure for a downlink subframe according to a number of deployed antennae;
    inserting, by the transmitting end, common reference symbols and user-specific reference symbols to be transmitted into the downlink subframe according to the reference symbol structure,
    transmitting the common reference symbols and the user-specific reference symbols; and
    transmitting reference symbol indication information, wherein the reference symbol indication information comprises information about the reference symbol structure, the number of antennae and a distribution of the user-specific reference symbols within the downlink subframe,
    wherein the transmitting end transmits the information on the reference symbol structure and the number of antennae through broadcasting; and the transmitting end determines whether the information on the distribution of the user-specific reference symbol within the downlink subframe is maintained unchanged within a preset time period or a preset number of frames; and if the information on the distribution of the user-specific reference symbol within the downlink subframe is maintained unchanged within the preset time period or the preset number of frames, the information on the distribution is transmitted through broadcasting; otherwise, the information on the distribution is transmitted through control signaling.

2. The method of claim 1, wherein the downlink subframe is received by a receiving end, and the receiving end obtains the common reference symbols and the user-specific reference symbols according to the reference symbol indication information transmitted by the transmitting end.

3. The method of claim 1, wherein in the reference symbol structure, the sub-carriers of the common reference symbols or the sub-carriers of the user-specific reference symbols within the same subgroup are distributed evenly at respective Orthogonal Frequency Division Multiplexing (OFDM) symbols, and the sub-carriers of the common reference symbols or the sub-carriers of the user-specific reference symbols within different subgroups are spaced by one or more sub-carriers in a frequency domain.

4. The method of claim 1, wherein a Generic frame structure is adopted by the downlink subframe; and a group of sub-carriers of the common reference symbols and sub-carriers of the user-specific reference symbols are located at a first Orthogonal Frequency Division Multiplexing (OFDM) symbol, a second OFDM symbol and an antepenultimate OFDM symbol within a slot.

5. The method of claim 1, wherein an Alternative frame structure is adopted by the downlink subframe; and a group of sub-carriers of the common reference symbols and sub-carriers of the user-specific reference symbols are located at a first two Orthogonal Frequency Division Multiplexing (OFDM) symbols, a penultimate OFDM symbol and an antepenultimate OFDM symbol within a subframe.

6. The method of claim 1, wherein to insert into the downlink subframe the common reference symbols and the user-specific reference symbols to be transmitted, the common reference symbols to be transmitted using the same antenna or the user-specific reference symbols to be transmitted using the same beam are inserted into various Orthogonal Frequency Division Multiplexing (OFDM) symbols in an interleaving way.

7. The method of claim 1, wherein the information about the distribution of the user-specific reference symbol within the downlink subframe is bound to a frame structure or a duplex mode; and a receiving end obtains the information about the distribution of the user-specific reference symbols within the downlink subframe according to the frame structure or the duplex mode adopted by the received subframe.

* * * * *